United States Patent
Gao et al.

(10) Patent No.: US 11,849,127 B2
(45) Date of Patent: Dec. 19, 2023

(54) VIDEO ENCODING METHOD, VIDEO DECODING METHOD, AND RELATED APPARATUSES

(71) Applicant: Tencent Technology (Shenzhen) Company Limited, Shenzhen (CN)

(72) Inventors: Xinwei Gao, Shenzhen (CN); Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 305 days.

(21) Appl. No.: 17/478,751

(22) Filed: Sep. 17, 2021

(65) Prior Publication Data

US 2022/0007039 A1    Jan. 6, 2022

Related U.S. Application Data

(63) Continuation of application No. PCT/CN2020/114172, filed on Sep. 9, 2020.

(30) Foreign Application Priority Data

Sep. 27, 2019   (CN) ........................ 201910927108.8

(51) Int. Cl.
    *H04N 19/30*        (2014.01)
    *H04N 19/103*      (2014.01)
               (Continued)

(52) U.S. Cl.
    CPC ........... *H04N 19/30* (2014.11); *H04N 19/103* (2014.11); *H04N 19/119* (2014.11);
               (Continued)

(58) Field of Classification Search
CPC .... H04N 19/30; H04N 19/103; H04N 19/119; H04N 19/132; H04N 19/136; H04N 19/172; H04N 19/176
(Continued)

(56) References Cited

U.S. PATENT DOCUMENTS

2002/0064226 A1    5/2002   Bauer et al.
2012/0275511 A1   11/2012   Shemer et al.

FOREIGN PATENT DOCUMENTS

CN       101778275 A     7/2010
CN       107155107 A     9/2017
             (Continued)

OTHER PUBLICATIONS

Tencent Technology, ISR, PCT/CN2020/114172, Nov. 26, 2020, 3 pgs.

(Continued)

*Primary Examiner* — Nguyen T Truong
(74) *Attorney, Agent, or Firm* — Morgan, Lewis & Bockius LLP

(57) ABSTRACT

A video decoding method, a video encoding method, and related apparatuses. The video decoding method includes: determining a current video frame; obtaining, from video frames that have been decoded, a first quantity of blocks of a first size and a second quantity of blocks of a second size in a reference frame associated with the current video frame, the first size being less than the second size; determining, according to a relationship between the first quantity and the second quantity, a target resolution used for decoding the current video frame; and decoding the current video frame by using the target resolution. In this application, the technical problem of the relatively low video encoding and decoding efficiency caused by complex processing operations in the related art is resolved.

20 Claims, 9 Drawing Sheets

(51) Int. Cl.
   *H04N 19/119* (2014.01)
   *H04N 19/132* (2014.01)
   *H04N 19/136* (2014.01)
   *H04N 19/172* (2014.01)
   *H04N 19/176* (2014.01)

(52) U.S. Cl.
   CPC ......... *H04N 19/132* (2014.11); *H04N 19/136* (2014.11); *H04N 19/172* (2014.11); *H04N 19/176* (2014.11)

(58) Field of Classification Search
   USPC .................................................. 375/240.02
   See application file for complete search history.

(56) References Cited

FOREIGN PATENT DOCUMENTS

| | | |
|---|---|---|
| CN | 108391127 A | 8/2018 |
| CN | 108833917 A | 11/2018 |
| CN | 110582022 A | 12/2019 |

OTHER PUBLICATIONS

Tencent Technology, WO, PCT/CN2020/114172, Nov. 26, 2020, 5 pgs.
Tencent Technology, IPRP, PCT/CN2020/114172, Mar. 15, 2022, 6 pgs.

VIDEO ENCODING METHOD, VIDEO DECODING METHOD, AND RELATED APPARATUSES

CROSS-REFERENCE TO RELATED APPLICATIONS

This application is a continuation application of PCT Patent Application No. PCT/CN2020/114172, entitled "VIDEO ENCODING METHOD, VIDEO DECODING METHOD, AND RELATED APPARATUSES" filed on Sep. 9, 2020, which claims priority to Chinese Patent Application No. 201910927108.8, entitled "VIDEO ENCODING METHOD AND APPARATUS, VIDEO DECODING METHOD AND APPARATUS, AND STORAGE MEDIUM" filed with the China National Intellectual Property Administration on Sep. 27, 2019, all of which are incorporated herein by reference in their entirety.

This application is related to U.S. application Ser. No. 17/503,161, entitled "VIDEO ENCODING METHOD, VIDEO DECODING METHOD, AND RELATED APPARATUSES" filed on xxx, which is incorporated by reference in its entirety.

This application is related to U.S. application Ser. No. 17/503,164, entitled "VIDEO ENCODING METHOD, VIDEO DECODING METHOD, AND RELATED APPARATUSES" filed on xxx, which is incorporated by reference in its entirety.

This application is related to U.S. application Ser. No. 17/503,170, entitled "VIDEO ENCODING METHOD, VIDEO DECODING METHOD, AND RELATED APPARATUSES" filed on xxx, which is incorporated by reference in its entirety.

FIELD OF THE TECHNOLOGY

This application relates to the field of audio and video encoding and decoding, and in particular, to video encoding and video decoding.

BACKGROUND OF THE DISCLOSURE

With the development of digital media technologies and computer technologies, videos are applied to various fields such as mobile communication, online surveillance, and online television. With the improvement of hardware performance and screen resolution, users' demand for high-definition videos is increasing.

Under the condition of limited mobile transmission bandwidth, a codec usually encodes and decodes a video frame by using the same resolution, resulting in a relatively low peak signal to noise ratio (PSNR) in partial transmission bandwidth. For example, when the codec uses a high resolution under a small transmission bandwidth, the PSNR is relatively small while the distortion of the image frames is relatively large. Similarly, when the codec uses a low resolution under a high transmission bandwidth, the PSNR is also relatively small while the distortion of the image frames is relatively large.

SUMMARY

Embodiments of this application provide a video encoding method, a video decoding method, and related apparatuses, to resolve at least the technical problem of relatively low video encoding and decoding efficiency caused by complex processing operations provided in the related art.

According to an aspect of the embodiments of this application, a video decoding method is provided, performed by an electronic device, the method including: determining a current video frame; obtaining, from video frames that have been decoded, a first quantity of blocks of a first size and a second quantity of blocks of a second size in a reference frame associated with the current video frame, the first size being less than the second size; determining, according to a relationship between the first quantity and the second quantity, a target resolution used for decoding the current video frame; and decoding the current video frame by using the target resolution.

According to another aspect of the embodiments of this application, a video encoding method is provided, performed by an electronic device, the method including: determining a current video frame; obtaining, from video frames that have been encoded, a first quantity of blocks of a first size and a second quantity of blocks of a second size in a reference frame associated with the current video frame, the first size being less than the second size; determining, according to a relationship between the first quantity and the second quantity, a target resolution used for encoding the current video frame; and encoding the current video frame by using the target resolution.

According to still another aspect of the embodiments of this application, a video decoding apparatus is provided, including: a decoding determining module, configured to determine a current video frame; an obtaining module, configured to obtain, from video frames that have been decoded, a first quantity of blocks of a first size and a second quantity of blocks of a second size in a reference frame associated with the current video frame, the first size being less than the second size; a first processing module, configured to determine, according to a relationship between the first quantity and the second quantity, a target resolution used for decoding the current video frame; and a decoding module, configured to decode the current video frame by using the target resolution.

According to still another aspect of the embodiments of this application, a video encoding apparatus is provided, including: an encoding determining module, configured to determine a current video frame; an obtaining module, configured to obtain, from video frames that have been encoded, a first quantity of blocks of a first size and a second quantity of blocks of a second size in a reference frame associated with the current video frame, the first size being less than the second size; a processing module, configured to determine, according to a relationship between the first quantity and the second quantity, a target resolution used for encoding the current video frame; and an encoding module, configured to encode the current video frame by using the target resolution.

According to still another aspect of the embodiments of this application, a non-transitory computer-readable storage medium is further provided, storing computer-readable instructions the computer-readable instructions, when executed by a processor of an electronic device, causing the electronic device to perform the video decoding method or the video encoding method.

According to yet another aspect of the embodiments of this application, an electronic device is provided, the electronic device including:
   a processor, a communication interface, a memory, and a communication bus,
   the processor, the communication interface, and the memory communicating with each other by using the communication bus; the communication interface being an interface of a communication module; and the memory being configured to store computer-readable instructions, wherein the computer-readable instructions, when executed by the processor, cause the electronic device to perform the video decoding method or the video encoding method.

According to still another aspect of the embodiments of this application, a computer program product including instructions is provided, the instructions, when run on a computer, causing the computer to perform the video decoding method or the video encoding method.

In the embodiments of this application, for a determined current video frame, a first quantity of blocks of a first size and a second quantity of blocks of a second size in a reference frame associated with the current video frame may be obtained from video frames that have been decoded, the first size being less than the second size, a target resolution used for decoding the current video frame is determined by using a relationship between the first quantity and the second quantity, and the current video frame is decoded by using the target resolution. For different current video frames, different resolutions may be adaptively selected, to simplify operations of determining the target resolution used for decoding the current video frame, thereby overcoming the problem of relatively low video decoding efficiency in the related art and achieving the effect of improving decoding efficiency. Further, the technical problem of relatively low video encoding and decoding efficiency caused by complex processing operations provided in the related art is resolved.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of this application, a video decoding method is provided. In one implementation, the video decoding method is applicable to, but is not limited to, an application environment shown in FIG. 1. The application environment includes a terminal 102 and a server 104. The terminal 102 and the server 104 communicate with each other by using a network. The terminal 102 may be, but is not limited to, a smartphone, a tablet computer, a laptop computer, a desktop computer, or the like, but is not limited thereto. The server 104 may be, but is not limited to, a computer processing device having a relatively strong data processing capability and a particular storage space.

The video decoding method and the video encoding method provided in the embodiments of this application may be performed by an electronic device, and the electronic device has video encoding and decoding functions, for example, may be the terminal 102 or the server 104.

Figure 1:
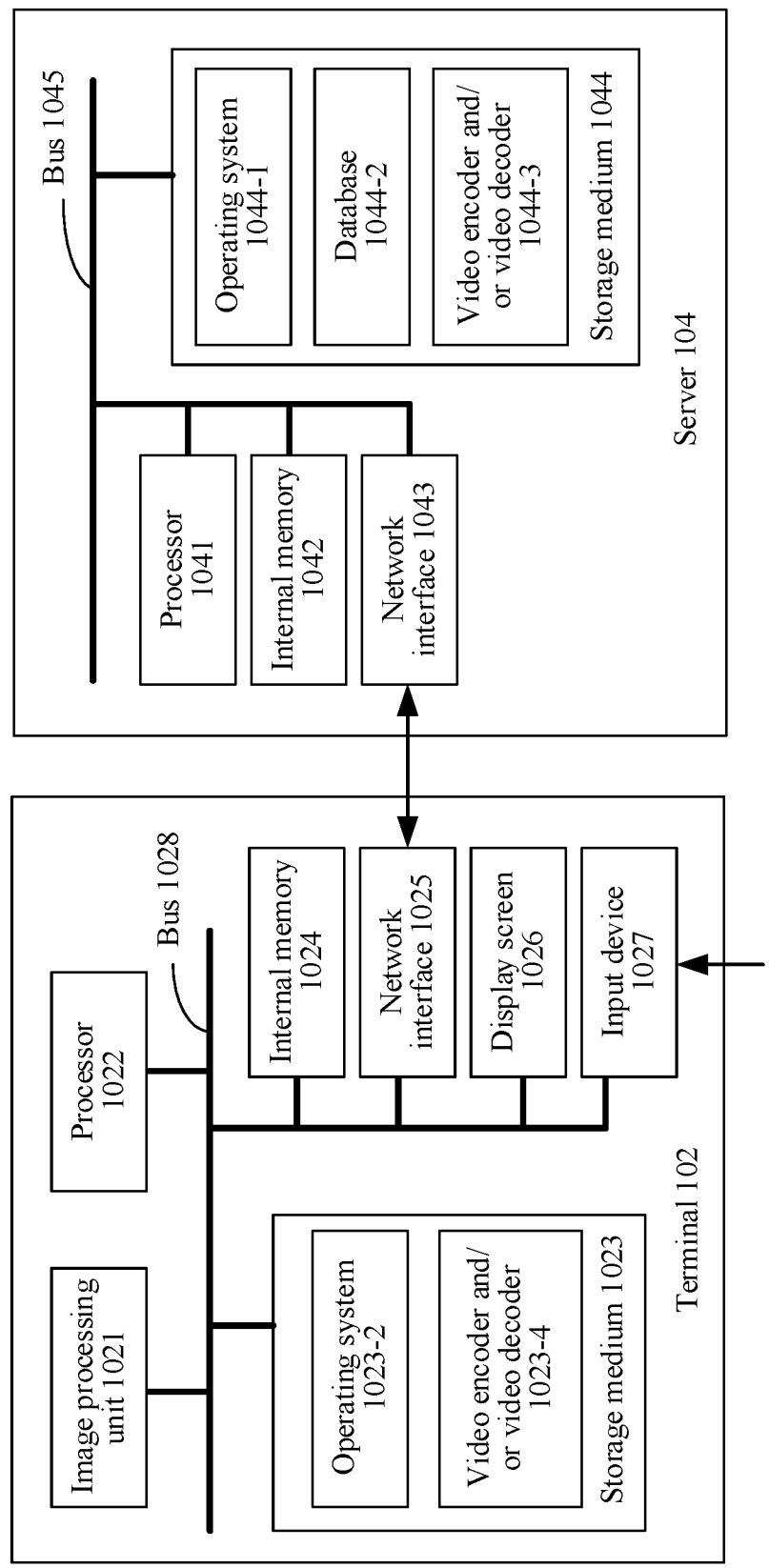
FIG. 1 is a schematic diagram of an application environment of an exemplary video decoding method according to an embodiment of this application.

The video encoding method corresponding to the video decoding method is alternatively applicable to, but is not limited to, the application environment shown in FIG. 1. After a to-be-encoded video is obtained, the video encoding method provided in this application may be used, but is not limited thereto. Resolutions used for encoding video frames in different to-be-encoded videos are adaptively determined through an interaction process between the terminal 102 and the server 104 shown in FIG. 1, so that different video frames are encoded by using different resolutions, thereby saving the transmission bandwidth and ensuring the encoding quality of a video frame, to avoid the problem of distortion. In addition, after a to-be-decoded video is obtained, the video decoding method provided in this application may be alternatively used, but is not limited thereto. Resolutions used for decoding video frames in different to-be-decoded videos are adaptively determined through an interaction process between the terminal 102 and the server 104 shown in FIG. 1, so that different video frames are decoded by using different resolutions, thereby ensuring the decoding quality of a video frame, to avoid the problem of distortion.

In an embodiment, the terminal 102 may include, but is not limited to, the following components: an image processing unit 1021, a processor 1022, a storage medium 1023, an internal memory 1024, a network interface 1025, a display screen 1026, and an input device 1027. The components may be connected by, but is not limited to, a system bus 1028. The image processing unit 1021 is configured to provide at least a drawing capability of a display interface. The processor 1022 is configured to provide computing and control capabilities, to support operation of the terminal 102. An operating system 1023-2 and a video encoder and/or a video decoder 1023-4 are stored in the storage medium 1023. The operating system 1023-2 is configured to provide a control operation instruction, and the video encoder and/or the video decoder 1023-4 is configured to perform an encoding/decoding operation according to the control operation instruction. In addition, the internal memory provides an operation environment for the video encoder and/or the video decoder 1023-4 in the storage medium 1023. The network interface 1025 is configured to perform network communication with a network interface 1043 in the server 104. The display screen is configured to display an application interface such as a video decoding interface. The input device 1027 is configured to receive a command, data, or the like entered by a user. For the terminal 102 having a touchscreen, the display screen 1026 and the input device 1027 may be the touchscreen. The internal structures of the terminal shown in FIG. 1 are merely block diagrams of partial structures related to a solution in this application, and do not constitute a limitation to the terminal to which the solution in this application is applied. Specifically, the terminal or the server may include more components or fewer components than those shown in the figures, or some components may be combined, or a different component deployment may be used.

In an embodiment, the server 104 may include, but is not limited to, the following components: a processor 1041, an internal memory 1042, a network interface 1043, and a storage medium 1044. The components may be connected by, but is not limited to, a system bus 1045. The storage medium 1044 includes an operating system 1044-1, a database 1044-2, a video encoder and/or a video decoder 1044-3. The processor 1041 is configured to provide computing and control capabilities, to support operation of the server 104. The internal memory 1042 provides an environment for operation of the video encoder and/or the video decoder 1044-3 in the storage medium 1044. The network interface 1043 is configured to connect to and communicate with the network interface 1025 of the external terminal 102 by using a network. The operating system 1044-1 in the storage medium is configured to provide a control operation instruction. The video encoder and/or the video decoder 1044-3 is configured to perform an encoding/decoding operation according to the control operation instruction. The database 1044-2 is configured to store data. The internal structures of the server shown in FIG. 1 are merely block diagrams of partial structures related to a solution in this application, and do not constitute a limitation to a computer device to which the solution in this application is applied. Specifically, the computer device has different component configurations.

In an embodiment, the network may include, but is not limited to, a wired network. The wired network may include, but is not limited to: a wide area network, a metropolitan area network, and a local area network. The foregoing is merely an example, and this is not limited in this embodiment.

Figure 2:
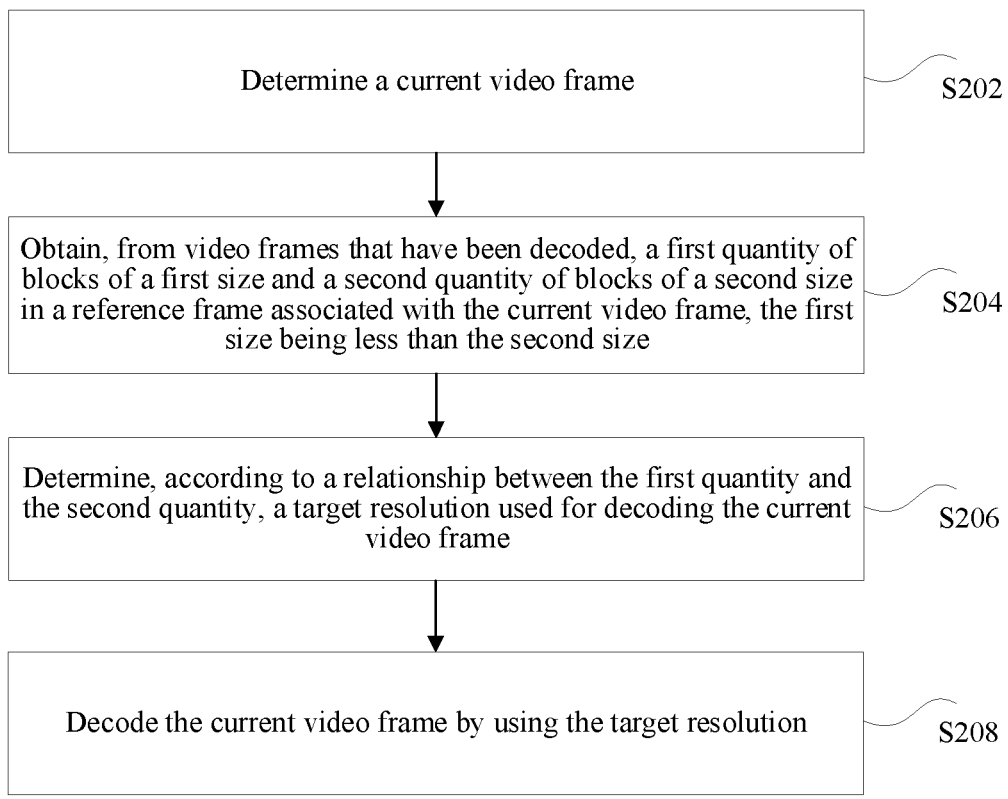
FIG. 2 is a flowchart of an exemplary video decoding method according to an embodiment of this application.

According to an aspect of the embodiments of this application, a video decoding method is provided. As shown in FIG. 2, the method includes the following steps:

S202: Determine a current video frame.

S204: Obtain, from video frames that have been decoded, a first quantity of blocks of a first size and a second quantity of blocks of a second size in a reference frame associated with the current video frame, the first size being less than the second size.

S206: Determine, according to a relationship between the first quantity and the second quantity, a target resolution used for decoding the current video frame.

S208: Decode the current video frame by using the target resolution.

The video decoding method shown in FIG. 2 is applicable to, but is not limited to, the video decoder shown in FIG. 1. A decoding process of the current video frame is completed through interaction and cooperation between the video decoder and another component.

In some embodiments, the video decoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video decoding method provided in this embodiment is applicable to, but is not limited to, a playback device configured to play a video in the application scenario. After video frames that have been decoded are obtained, a target resolution used for decoding a current video frame is adaptively determined based on a relationship between a first quantity of blocks of a first size and a second quantity of blocks of a second size in a reference frame determined from the video frames, the first size being less than the second size, to simplify operations of determining the target resolution used for decoding the current video frame, thereby overcoming the problem of relatively low video decoding efficiency in the related art and achieving the effect of improving decoding efficiency.

In this embodiment, for a determined current video frame, a first quantity of blocks of a first size and a second quantity of blocks of a second size in a reference frame associated with the current video frame may be obtained from video frames that have been decoded, the first size being less than the second size, a target resolution used for decoding the current video frame is determined by using a relationship between the first quantity and the second quantity, and the current video frame is decoded by using the target resolution. Therefore, the resolution used for decoding the current video frame is determined by using the relationship between the first quantity of blocks of the first size and the second quantity of blocks of the second size, to adaptively select different resolutions for different current video frames, to simplify operations of determining the target resolution used for decoding the current video frame, thereby overcoming the problem of relatively low video decoding efficiency in the related art and achieving the effect of improving decoding efficiency.

Moreover, in this embodiment, the blocks of different sizes may be, but are not limited to, blocks of different size specifications correspondingly configured according to different video encoding standards. The block of the second size may be, but is not limited to, a large block that is of a size greater than a reference size and is determined based on the video encoding standard, and the block of the first size may be, but is not limited to, a small block that is of a size less than the reference size and is determined based on the video encoding standard. The distinguishing configuration for the blocks of two sizes is merely an example, and this is not limited in this embodiment.

In some embodiments, after a current video frame in a to-be-decoded video is determined from a bitstream received by an encoding device, a reference frame may be determined from, but is not limited to, video frames that have been decoded before the current video frame, and a first quantity of blocks of a first size and a second quantity of blocks of a second size are obtained from the reference frame based on a reference size. The obtaining manner may include, but is not limited to, at least one of the following:

(1) dividing, according to a size division policy agreed on with an encoding device on an encoder side, a reference frame obtained by a current decoder side, to obtain a first quantity of blocks of a first size and a second quantity of blocks of a second size; and (2) parsing a bitstream to obtain a flag bit, and determining the first quantity of blocks of the first size and the second quantity of blocks of the second size according to an indication of the flag bit.

In some embodiments, the determining, according to a relationship between the first quantity of blocks of the first size and the second quantity of blocks of the second size in the reference frame, a target resolution used for decoding the current video frame may include, but is not limited to: obtaining a ratio of the first quantity of blocks of the first size to the second quantity of blocks of the second size; and determining the target resolution according to a result of comparison between the ratio and a preset threshold. For example, a first resolution is used as the target resolution when the ratio is greater than the preset threshold; and a second resolution is used as the target resolution when the ratio is less than the preset threshold, the second resolution being greater than the first resolution. That is, when a quantity of blocks of the second size is larger, the ratio is smaller, and a used resolution is higher. In comparison, when a quantity of blocks of the second size is smaller, the ratio is larger, and a used resolution is lower. The determining manner is merely an example, and is not limited in this embodiment.

Moreover, in this embodiment, the first resolution may include, but is not limited to: an original resolution of the current video frame, and a highest resolution obtained by upsampling the current video frame. The second resolution may include, but is not limited to: a resolution obtained by downsampling the first resolution according to a predetermined sampling ratio. The sampling ratio may be determined according to, but is not limited to, a result of comparison between the ratios and different thresholds. The different thresholds herein may be, but are not limited to, a group of thresholds determined from a value interval greater than the preset threshold.

Further, in this embodiment, the reference frame may include, but is not limited to one of the following: one reference frame in video frames that have been decoded and a plurality of reference frames in the video frames that have been decoded. The plurality of reference frames may include, but are not limited to: a plurality of consecutive video frames or a plurality of nonconsecutive video frames in the video frames that have been decoded.

In some embodiments, before a target resolution used for decoding a current video frame is adaptively determined, a determining basis may be determined in, but is not limited to, the following manner:

(1) Obtain a first quantity of blocks of a first size and a second quantity of blocks of a second size in a reference frame in a manner agreed on with the encoding device, the first size being less than the second size. The target resolution used for decoding the current video frame is adaptively determined based on a result of comparison between a preset threshold and a ratio of the first quantity to the second quantity. For example, the encoder side and the decoder side may determine, in the same manner according to an agreement in a communication standard, resolutions to be used on two sides.

(2) Obtain a bitstream sent by the encoding device, and parse the bitstream to obtain a decoding flag bit, the decoding flag bit being used for indicating the target resolution used for decoding the current video frame.

In this embodiment, the decoding device on the decoder side may adaptively determine, in a manner the same as that in the encoding device according to an agreement, a target resolution used for decoding the current video frame, and the manner may be: determining the target resolution based on a result of comparison between a preset threshold and a ratio of the first quantity of blocks of the first size to the second quantity of blocks of the second size.

In some embodiments, the decoding the current video frame by using the target resolution may include, but is not limited to: after the target resolution used for decoding the current video frame is adaptively determined, decoding the current video frame based on the target resolution by using, but is not limited to, the related art:

S1: Determine a current decoding mode corresponding to the current video frame. For example, a flag bit corresponding to a preset position in a bitstream is obtained, and information about a current encoding mode is obtained by using the flag bit, thereby determining whether the current decoding mode is a full resolution mode or a downsampling mode. The current decoding mode is the same as the current encoding mode.

S2: Determine a processing reference frame according to a resolution of a current reference frame corresponding to the current video frame and the target resolution of the current video frame obtained through decision-making. It is determined whether the resolution of the current reference frame is the same as the target resolution. If the resolution of the current reference frame is the same as the target resolution, the current reference frame is directly used as the processing reference frame; and if the resolution of the current reference frame is different from the target resolution, S3 is performed.

S3: Sample the current reference frame according to a preset sampling rule, to obtain the corresponding processing reference frame. The preset sampling rule used during decoding is the same as a preset sampling rule used during encoding. For example, the preset sampling rule used on the encoder side may be related to, but is not limited to, a resolution of a current encoded video frame and a distance between the current reference frame and the current encoded video frame. If a distance D between the current reference frame and the current encoded video frame exceeds a preset threshold, 1/M downsampling is used, or otherwise, 1/N downsampling is used, M<N. A reference value of a relatively far reference frame may be less than that of a relatively close reference frame. Therefore, even if the resolution of the relatively far current reference frame is different from that of the current encoded video frame, the relatively far current reference frame may not be sampled, or a resolution change of the relatively far current reference frame after being sampled becomes relatively small. Correspondingly, the decoder side may alternatively perform sampling by using the same method, so that a sampling speed can be accelerated, thereby increasing an entire decoding speed. A value of M varies with the distance D, thereby further improving the flexibility of a sampling parameter.

In addition, if the resolution of the current reference frame is different from a resolution (for example, the target resolution) of a current decoded video frame, the current reference frame is sampled to obtain a processing reference frame having a resolution the same as that of the current decoded video frame. Sampling the current reference frame includes upsampling and downsampling. If the resolution of the current reference frame is greater than that of the current decoded video frame, downsampling is performed on the current reference frame to obtain the processing reference frame. If the resolution of the current reference frame is less than that of the current decoded video frame, upsampling is performed on the current reference frame to obtain the processing reference frame. In an embodiment, if there are a plurality of current reference frames, each current reference frame is sampled according to the resolution of the reference frame and the resolution of the current decoded video frame to obtain a processing reference frame having a resolution the same as that of the current decoded video frame.

Further, in this embodiment, a sampling algorithm used for sampling the current reference frame matches a sampling algorithm used to downsample a reestablished video frame to obtain a decoded video frame. To be specific, if the reference frame is downsampled, a downsampling algorithm is the same as a downsampling algorithm used to downsample the reestablished video frame to obtain the decoded video frame. If the reference frame is upsampled, an upsampling algorithm is a reverse sampling algorithm matching the downsampling algorithm used to downsample the reestablished video frame to obtain the decoded video frame.

S4: Decode a current decoded video frame according to the processing reference frame, to obtain a reestablished video frame. A prediction residual in the bitstream is decoded and is superimposed with a predicted pixel corresponding to the processing reference frame, to obtain a reestablished video frame.

S5: Process the reestablished video frame according to the current decoding mode, to obtain a decoded video frame, upsample the reestablished video frame to obtain the decoded video frame if the current decoding mode is a downsampling mode, and determine the reestablished video frame as the decoded video frame if information about a current encoding mode is a full sampling mode.

Specifically, an algorithm for upsampling the reestablished video frame is a reverse sampling algorithm matching an algorithm used by an encoder side to downsample a current video frame to obtain a current encoded video frame.

In this embodiment, at least one pair of decoding blocks to be reconstructed are determined from the current video frame, each pair of decoding blocks in the at least one pair of decoding blocks including a first decoding block using a first resolution and a second decoding block using a second resolution, the first decoding block and the second decoding block being adjacent decoding blocks; the first resolution of the first decoding block is adjusted to the target resolution, and the second resolution of the second decoding block is adjusted to the target resolution; a first edge pixel set is determined from the first decoding block, and a second edge pixel set is determined from the second decoding block, a position of the first edge pixel set being adjacent to a position of the second edge pixel set; and the first edge pixel set is filtered, to obtain a filtered first edge pixel set, and the second edge pixel set is filtered, to obtain a filtered second edge pixel set, a first difference between a pixel value of an $i^{th}$ pixel in the filtered first edge pixel set and a pixel value of a $j^{th}$ pixel that corresponds to the $i^{th}$ pixel and is in the filtered second edge pixel set being less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

The manner of adjusting the target resolution includes one of the following:
  (1) adjusting the second resolution to the first resolution when the target resolution is equal to the first resolution;
  (2) adjusting the first resolution to the second resolution when the target resolution is equal to the second resolution; and
  (3) when the target resolution is equal to a third resolution, adjusting the first resolution to the third resolution, and adjusting the second resolution to the third resolution, the third resolution being different from the first resolution and being different from the second resolution.

The resolutions of the decoding blocks are adjusted, and edge filtering is performed on the edge pixel sets determined from the decoding blocks, so that an obvious seam in a video can be avoided during reconstruction, thereby ensuring accurate restoration of content in the video and further resolving the technical problem of video distortion caused by inconsistent resolutions.

According to the embodiments of this application, for a determined current video frame, a first quantity of blocks of a first size and a second quantity of blocks of a second size in a reference frame associated with the current video frame may be obtained from video frames that have been decoded, the first size being less than the second size, a target resolution used for decoding the current video frame is determined by using a relationship between the first quantity and the second quantity, and the current video frame is decoded by using the target resolution. Therefore, the resolution used for decoding the current video frame is determined by using the relationship between the first quantity of blocks of the first size and the second quantity of blocks of the second size, to adaptively select different resolutions for different current video frames, to simplify operations of determining the target resolution used for decoding the current video frame, thereby overcoming the problem of relatively low video decoding efficiency in the related art and achieving the effect of improving decoding efficiency.

As an exemplary solution, the determining, according to a relationship between the first quantity and the second quantity, a target resolution used for decoding the current video frame includes the following steps:

(1) using a first resolution as the target resolution when a ratio of the first quantity to the second quantity is greater than a preset threshold; and
(2) using a second resolution as the target resolution when the ratio of the first quantity to the second quantity is less than the preset threshold, the second resolution being greater than the first resolution.

In this embodiment, the first resolution may include, but is not limited to: an original resolution of the current video frame, and a highest resolution obtained by upsampling the current video frame. The second resolution may include, but is not limited to: a resolution obtained by downsampling the first resolution according to a predetermined sampling ratio. The sampling ratio may be determined according to, but is not limited to, a result of comparison between the ratios and different thresholds. The different thresholds herein may be, but are not limited to, a group of thresholds determined from a value interval greater than the preset threshold.

In some embodiments, before the decoding the current video frame by using a second resolution, the method further includes the following steps:

S1: Determine a group of thresholds from a value interval greater than the preset threshold when the ratio of the first quantity to the second quantity is greater than the preset threshold.

S2: Compare the ratio of the first quantity to the second quantity with thresholds included in the group of thresholds.

S3: Determine a sampling ratio according to a result of the comparison.

S4: Downsample the second resolution according to the sampling ratio, to determine the first resolution.

In some embodiments, the determining a sampling ratio according to a result of the comparison includes: obtaining, when it is determined that the ratio of the first quantity to the second quantity falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

Specifically, a description is provided with reference to the following example. It is assumed that the preset threshold is A1, the group of thresholds determined from the value interval greater than the preset threshold include: A2 to A5, A2 being less than A3, A3 being less than A4, A4 being less than A5. Further, it is assumed that a ratio of a first quantity M of blocks of a first size to a second quantity N of blocks of a second size in a reference frame is r. A determining process may be as follows.

When it is determined that r<A1, it indicates that there are a large quantity of same images in the video frames that have been decoded, and correspondingly, the current video frame is decoded by using a high resolution R (for example, the first resolution). When it is determined that A1<r≤A2, it may be determined that the sampling ratio is ¾ a width and a height of the high resolution R, and the high resolution R is sampled by using the sampling ratio, to obtain a resolution R' (for example, the first resolution) used for decoding.

When it is determined that A3<r≤A4, it may be determined that the sampling ratio is ⅔ the width and the height of the high resolution R, and the high resolution R is sampled by using the sampling ratio, to obtain the resolution R' (for example, the second resolution) used for decoding. When it is determined that A4<r≤A5, it may be determined that the sampling ratio is ⅓ the width and the height of the high resolution R, and the high resolution R is sampled by using the sampling ratio, to obtain the resolution R' (for example, the second resolution) used for decoding.

The foregoing sampling ratio is an example, and the interval corresponding to different thresholds may be set to different values. A value of the sampling ratio and a correspondence between the sampling ratios and the thresholds are not limited in this embodiment.

According to the embodiments of this application, a ratio of a first quantity of blocks of a first size to a second quantity of blocks of a second size in a reference frame is obtained, and then the ratio is compared with a preset threshold, so that a resolution matching a current video frame is adaptively selected according to a result of comparison between the ratio and the preset threshold, to improve the flexibility of determining the resolution, and a complex determining process is not required, so that the resolutions used for different video frames may be quickly determined during decoding, to improve decoding efficiency during decoding.

As an exemplary solution, the obtaining, from video frames that have been decoded, a first quantity of blocks of a first size and a second quantity of blocks of a second size in a reference frame associated with the current video frame includes the following steps:

S1: Determine one reference frame from the video frames that have been decoded as a target reference frame.

S2: Obtain the first quantity and the second quantity in the target reference frame.

In some embodiments, S1 of determining one reference frame from the video frames that have been decoded as a target reference frame includes: S11: determining a $(t-k)^{th}$ video frame as the target reference frame when the current video frame is a $t^{th}$ video frame; and S2 of obtaining the first quantity and the second quantity in the target reference frame includes: S21: obtaining the first quantity and the second quantity from the $(t-k)^{th}$ video frame, k being a predetermined positive integer, t being a positive integer, t being greater than k.

Figure 3:
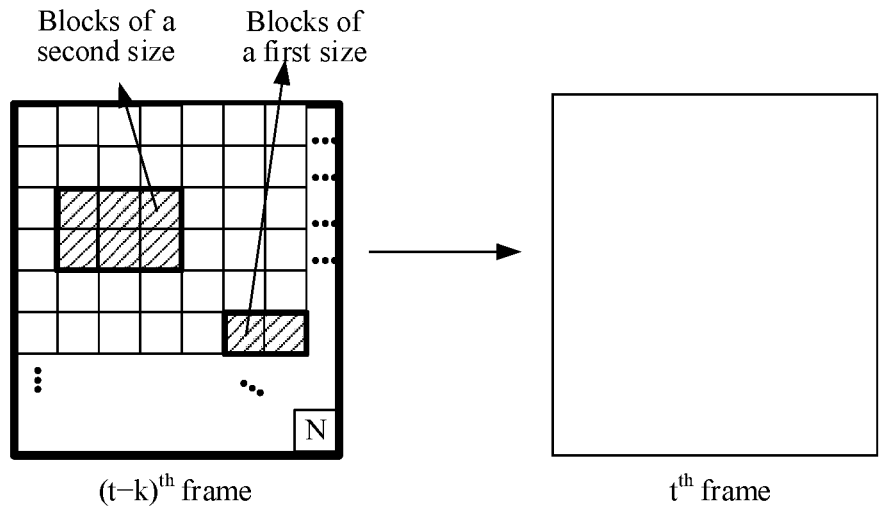
FIG. 3 is a schematic diagram of an exemplary video decoding method according to an embodiment of this application.

Specifically, a description is provided with reference to the example shown in FIG. 3. It is assumed that the current video frame is a $t^{th}$ video frame, and a reference frame is determined from the video frames that have been decoded as a $(t-k)^{th}$ video frame. Further, it is assumed that a first quantity M1 of blocks (for example, small blocks of oblique line regions in FIG. 3) of a first size and a second quantity M2 of blocks (for example, large blocks of oblique line regions in FIG. 3) of a second size are obtained from the $(t-k)^{th}$ video frame, and a ratio is calculated r=M1/M2.

For example, the ratio r is compared with the preset threshold A1. When r<A1, it is determined that the current video frame is decoded by using the first resolution R; and when r≥A1, a group of thresholds are obtained from a value interval greater than A1. It is assumed that the group of thresholds include: A2 to A5, A2 being less than A3, A3 being less than A4, A4 being less than A5. It is assumed that it is determined that A4≥r>A5 through the comparison, it may be determined that the sampling ratio is ⅓ a width and a height of the high resolution R (for example, the second resolution), and the high resolution R is sampled by using the sampling ratio, to obtain a resolution R' (for example, the first resolution) used for decoding. The $t^{th}$ video frame is decoded by using the resolution R' (for example, the first resolution).

According to the embodiments of this application, after one reference frame is determined from the video frames that have been decoded as the target reference frame, a first quantity of blocks of a first size and a second quantity of blocks of a second size in the target reference frame are obtained, so that a target resolution corresponding to a current video frame is adaptively selected by using a ratio of the first quantity of blocks of the first size to the second quantity of blocks of the second size for decoding. Therefore, a resolution used for decoding the current video frame is quickly determined, thereby overcoming the problem of the relatively low decoding efficiency caused by relatively complex operations of determining the resolution in the related art.

As an exemplary solution, the obtaining, from video frames that have been decoded, a first quantity of blocks of a first size and a second quantity of blocks of a second size in a reference frame associated with the current video frame includes the following steps:

S1: Determine a plurality of reference frames from the video frames that have been decoded as target reference frames.

S2: Obtain the first quantity of blocks in the target reference frames and the second quantity of blocks in the plurality of reference frames.

In some embodiments, the determining a plurality of reference frames from the video frames that have been decoded as target reference frames includes: determining a plurality of consecutive video frames or a plurality of nonconsecutive video frames from the video frames that have been decoded as the target reference frames.

Figure 4:
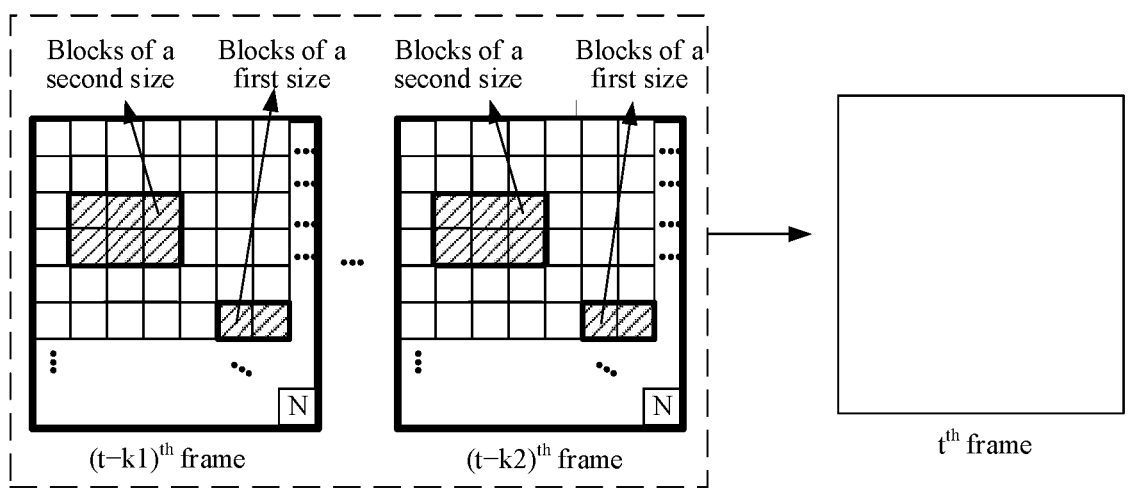
FIG. 4 is a schematic diagram of another exemplary video decoding method according to an embodiment of this application.

For example, the target reference frames may be consecutive reference frames. A plurality of consecutive video frames from a $(t-k1)^{th}$ video frame to a $(t-k2)^{th}$ video frame shown in FIG. 4 are determined as the target reference frames of the current video frame. It is assumed that the target reference frames include M1 blocks (for example, small blocks of oblique line regions in FIG. 4) of a first size and M2 blocks (for example, large blocks of oblique line regions in FIG. 4) of a second size. In addition, the target reference frames may be alternatively nonconsecutive reference frames. A plurality of discrete video frames are selected from the $(t-k1)^{th}$ video frame to the $(t-k2)^{th}$ video frame shown in FIG. 5. For example, a group of video frames including the $(t-k1)^{th}$ video frame and a group of video frames including the $(t-k2)^{th}$ video frame are determined as the target reference frames of the current video frame. It is assumed that the plurality of reference frames include M1 blocks (small blocks of oblique line regions shown in FIG. 5) of a first size and M2 blocks (large blocks of oblique line regions shown in FIG. 5) of a second size.

Figure 5:
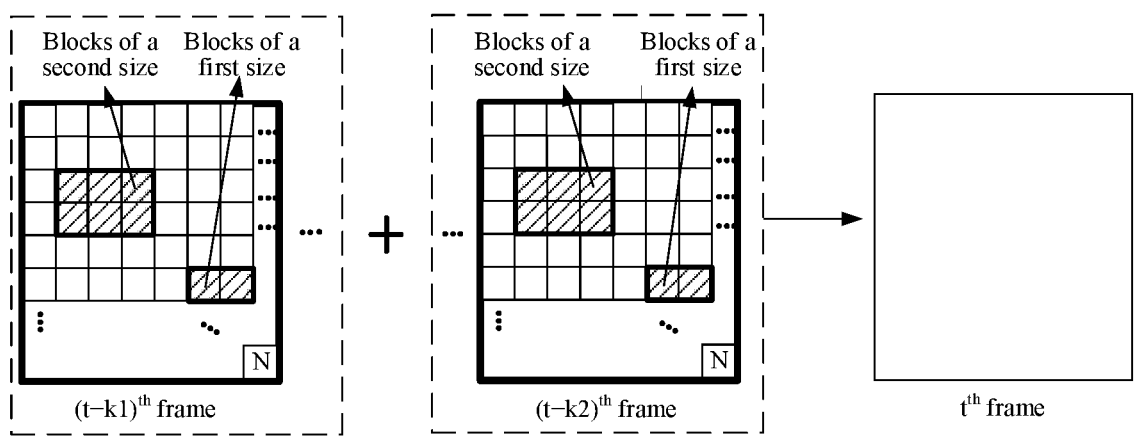
FIG. 5 is a schematic diagram of still another exemplary video decoding method according to an embodiment of this application.

In the target reference frames, total quantities of blocks in the reference frames may be the same value such as N (as shown in FIG. 4 and FIG. 5) or may be different values such as N1, N2, . . . (not shown in the figure). This is not limited in this embodiment.

The parameters k1 and k2 may be, but are not limited to, parameters agreed on with the encoding device on the encoder side in advance, or may be parameters determined by parsing a flag bit at a specified position in a bitstream. This is not limited in this embodiment.

In some embodiments, S1 of determining a plurality of reference frames from the video frames that have been decoded as target reference frames includes: S11: determining a (t-k1)th video frame to a (t-k2)th video frame as the target reference frames when the current video frame is a tth video frame; and S2 of obtaining the first quantity and the second quantity in the target reference frames includes: S21: obtaining the first quantity and the second quantity from the (t-k1)th video frame to the (t-k2)th video frame, k1 and k2 being predetermined positive integers, t being a positive integer, t being greater than k1, k1 being greater than k2.

Figure 6:
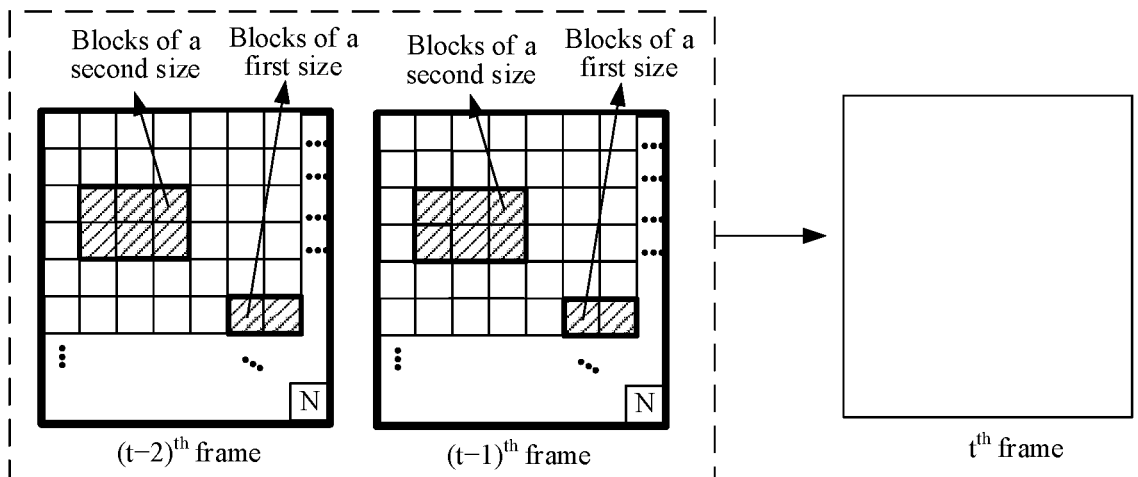
FIG. 6 is a schematic diagram of still another exemplary video decoding method according to an embodiment of this application.

Specifically, a description is provided with reference to the example shown in FIG. 6. It is assumed that the target reference frames are a plurality of consecutive video frames from a (t-1)th video frame to a (t-2)th video frame, a total quantity of blocks in each reference frame being N. Further, a first quantity M1 of blocks of a first size and a second quantity M2 of blocks of a second size are obtained from the (t-1)th frame, a first quantity N1 of blocks of a first size and a second quantity N2 of blocks of a second size are obtained from the (t-2)th frame, and a ratio r may be determined by using, but is not limited to, the following formulas:

$$r=M1/N1*a+M2/N2*b, a \text{ and } b \text{ being weights required for calculation, specific values of } a \text{ and } b \text{ being not limited; and} \quad (1)$$

$$r=[M1+N1]/[M2+N2]. \quad (2)$$

The formulas are merely examples and are not limited in this embodiment.

According to the embodiments of this application, after the plurality of reference frames are determined from the video frames that have been decoded as the target reference frames, a relationship between a first quantity of blocks of a first size and a second quantity of blocks of a second size in the target reference frames is obtained, so that a target resolution corresponding to a current video frame is adaptively selected. Therefore, a resolution used for decoding the current video frame is quickly determined, thereby overcoming the problem of the relatively low decoding efficiency caused by relatively complex operations of determining the resolution in the related art.

As an exemplary solution, the target resolution may be further determined in the following manner.

S1: Parse a bitstream to obtain a decoding flag bit corresponding to the current video frame.

S2: Obtain the target resolution indicated by the decoding flag bit.

To simplify operations of determining the target resolution on the decoder side, the encoder side may further directly write the target resolution determined by the encoding device in the determining manner into a bitstream in a manner of flag bit. The decoding device on the decoder side may directly obtain the determined target resolution after parsing the decoding flag bit from the bitstream.

The decoding flag bit may be indicated by, but is not limited to, the following syntax elements:

(1) obtaining a syntax element corresponding to each current video frame, the syntax element being used for indicating a resolution used for decoding the current video frame, a plurality of resolutions used for decoding a plurality of current video frames including at least two different resolutions; and (2) obtaining a syntax element corresponding to each current video frame in a plurality of current video frames, the syntax element being used for indicating a relationship between a third resolution and a fourth resolution, the third resolution being a resolution used for decoding the current video frame, the fourth resolution being a resolution used for decoding a reference frame of the current video frame, a plurality of resolutions used for decoding the plurality of current video frames including at least two different resolutions; and determining the third resolution corresponding to each region according to the syntax element and the fourth resolution.

In this way, regardless of whether transmission bandwidth is relatively small or is relatively large, a corresponding PSNR is relatively large, and distortion is relatively small, thereby ensuring that the PSNR can change within a relatively small range, and the PSNR is relatively large, thereby achieving the technical effect of avoiding a relatively large fluctuation of the PSNR for encoding and decoding a video.

According to the embodiments of this application, a determined target resolution required by decoding is directly obtained by using a decoding flag bit, to simplify a processing process of a decoder side, thereby reducing overheads during transmission and the decoding complexity of the decoder side and further achieving the effect of improving decoding efficiency.

Figure 7:
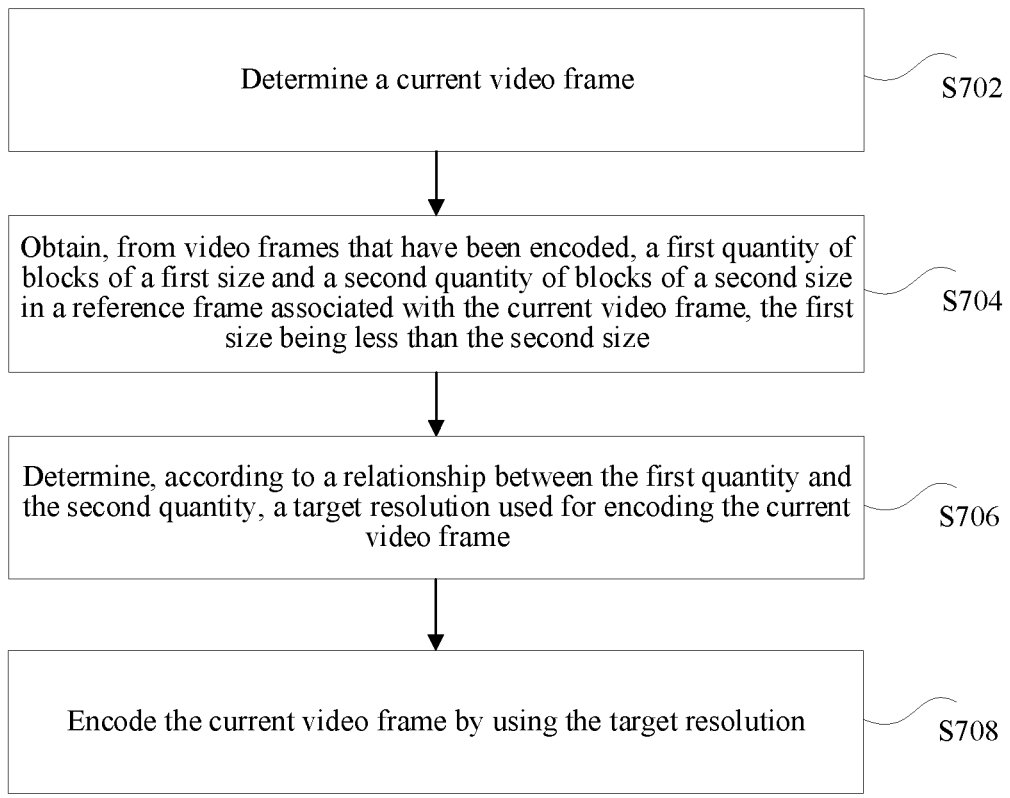
FIG. 7 is a flowchart of an exemplary video encoding method according to an embodiment of this application.

In one implementation, as shown in FIG. 7, the video encoding method includes the following steps:

S702: Determine a current video frame.

S704: Obtain, from video frames that have been encoded, a first quantity of blocks of a first size and a second quantity of blocks of a second size in a reference frame associated with the current video frame, the first size being less than the second size.

S706: Determine, according to a relationship between the first quantity and the second quantity, a target resolution used for encoding the current video frame.

S708: Encode the current video frame by using the target resolution.

The video encoding method shown in FIG. 7 is applicable to, but is not limited to, the video encoder shown in FIG. 1. An encoding process of the current video frame is completed through interaction and cooperation between the video encoder and another component.

In some embodiments, the video encoding method is applicable to, but is not limited to, an application scenario such as a video playback application, a video sharing application, or a video session application. A video transmitted in the application scenario may include, but is not limited to: a long video and a short video. For example, the long video may be a play episode with a relatively long playing time (for example, the playing time is greater than 10 minutes) or a picture presented in a long video session, and the short video may be a voice message exchanged between two or more parties or a video with a relatively short playing time (for example, the playing time is less than or equal to 30 seconds) presented on a sharing platform. The foregoing is merely an example. The video encoding method provided in this embodiment is applicable to, but is not limited to, the application scenario. After video frames that have been encoded are obtained, a target resolution used for encoding a current video frame is adaptively determined based on a relationship between a first quantity of blocks of a first size and a second quantity of blocks of a second size in a reference frame determined from the video frames, the first size being less than the second size, to simplify operations of determining the target resolution used for encoding the current video frame, thereby overcoming the problem of relatively low video encoding efficiency in the related art and achieving the effect of improving encoding efficiency.

In this embodiment, for a determined current video frame, a first quantity of blocks of a first size and a second quantity of blocks of a second size in a reference frame associated with the current video frame may be obtained from video frames that have been encoded, the first size being less than the second size, a target resolution used for encoding the current video frame is determined by using a relationship between the first quantity and the second quantity, and the current video frame is encoded by using the target resolution. For different current video frames, different resolutions may be adaptively selected, to simplify operations of determining the target resolution used for encoding the current video frame, thereby overcoming the problem of relatively low video encoding efficiency in the related art and achieving the effect of improving encoding efficiency.

As an exemplary solution, the determining, according to a relationship between the first quantity and the second quantity, a target resolution used for encoding the current video frame includes the following steps:

(1) using a first resolution as the target resolution when a ratio of the first quantity to the second quantity is greater than a preset threshold; and (2) using a second resolution as the target resolution when the ratio of the first quantity to the second quantity is less than the preset threshold, the second resolution being greater than the first resolution.

In some embodiments, the method further includes the following steps:

S1: Determine a group of thresholds from a value interval greater than the preset threshold when the ratio of the first quantity to the second quantity is greater than the preset threshold.

S2: Compare the ratio of the first quantity to the second quantity with thresholds included in the group of thresholds.

S3: Determine a sampling ratio according to a result of the comparison.

S4: Downsample the second resolution according to the sampling ratio, to determine the first resolution.

In some embodiments, the determining a sampling ratio according to a result of the comparison includes: obtaining, when it is determined that the ratio of the first quantity to the second quantity falls within a target interval, a target sampling ratio configured for the target interval, the target interval including a value between a first threshold and a second threshold that are adjacent in the group of thresholds, the first threshold being less than the second threshold; and the downsampling the second resolution according to the sampling ratio includes: downsampling a width and a height of the second resolution according to the target sampling ratio, to obtain the first resolution.

In this embodiment, for the specific embodiments of the video encoding method, reference may be made to, but is not limited to, the specific embodiments of the video decoding method. To-be-encoded video frames are encoded by using adaptively determined and matched resolutions in a processing manner opposite to the decoding method. In this embodiment, details are not described herein again.

Figure 8:
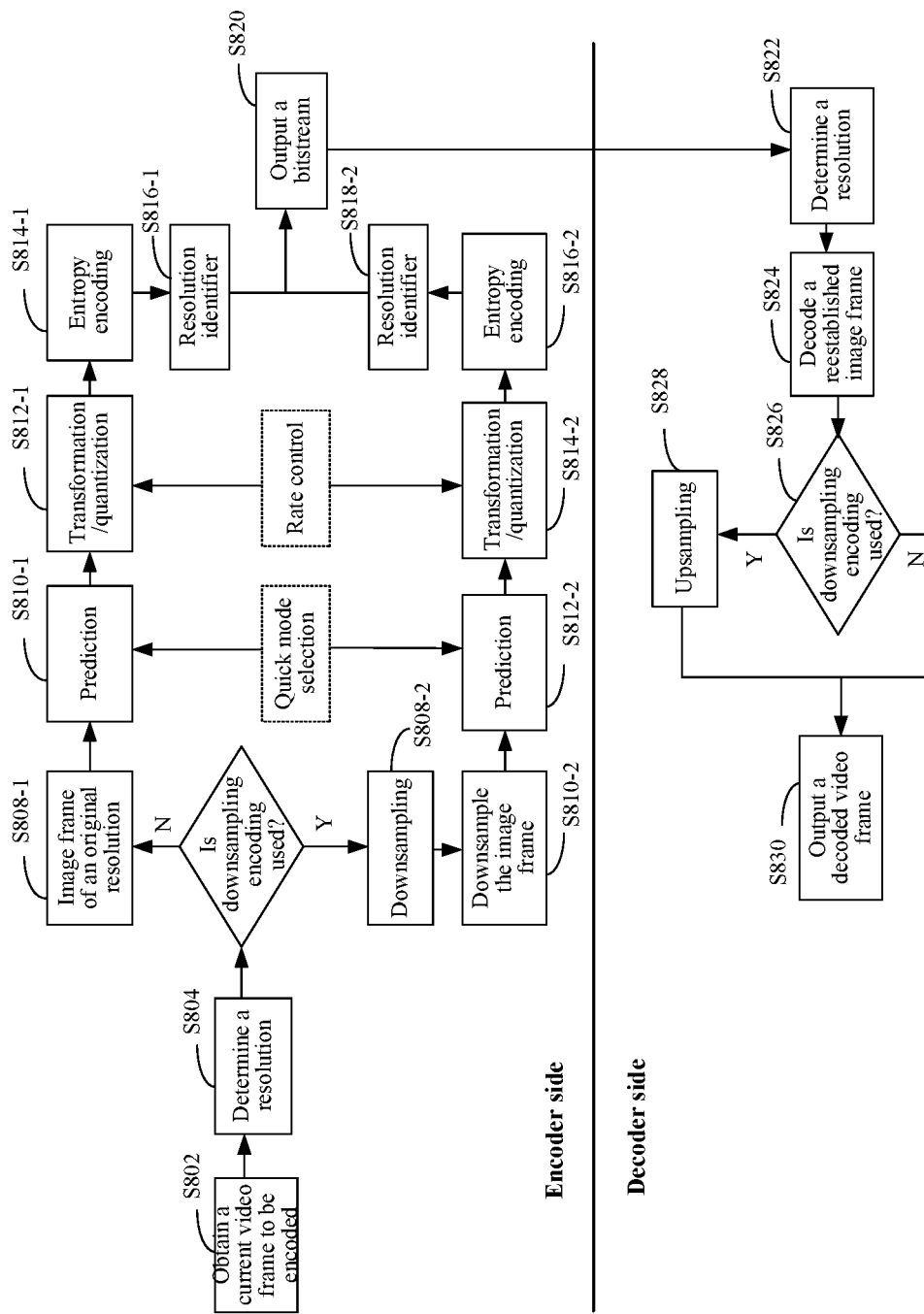
FIG. 8 is a schematic diagram of exemplary video encoding and decoding processes according to an embodiment of this application.

Specifically, a description is provided with reference to S802 to S830 in the example shown in FIG. 8. A current video frame is obtained on an encoder side, and a resolution used for encoding the current video frame is selected by determining a resolution. Subsequently, a current encoding mode is determined from optional encoding modes according to current encoding information and/or image feature information of the current video frame. If the current encoding mode is a full resolution mode, it is determined that downsampling encoding is not required, and S808-1 to S816-1 are performed; and intra/inter prediction is performed on an image frame with an original resolution to obtain a prediction residual, transformation/quantization and entropy encoding are performed to obtain encoded data, and a resolution identifier of the used resolution is determined. Further, the data is encoded, and as in S820, a bitstream is outputted.

If the current encoding mode is a downsampling mode, downsampling is required, and S810-2 to S818-2 are performed. A downsampling image frame is obtained, intra/inter prediction is performed on the image frame to obtain a prediction residual, transformation/quantization and entropy encoding are performed, to obtain encoded data, and a resolution identifier of the used resolution is determined. Further, the data is encoded, and as in S820, a bitstream is outputted.

Subsequently, the bitstream is inputted into the decoder side. For example, S822 to S830: adaptively determining a current video frame, to determine a resolution of the current video frame, and then decoding the current video frame to obtain a reestablished video frame. If it is determined that the downsampling mode is used, the reestablished video frame is upsampled, to obtain a decoded video frame, or otherwise, the decoded video frame is directly outputted.

The foregoing is merely an example. The video encoding method and the video decoding method provided in this embodiment are applicable to a resolution determining process shown in the figures and used for adaptively determining resolutions for different current video frames/current video frames on an encoder side and a decoder side, to simplify a process of determining resolutions used for frames during encoding and decoding, thereby achieving the effect of improving the encoding and decoding efficiency.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 9:
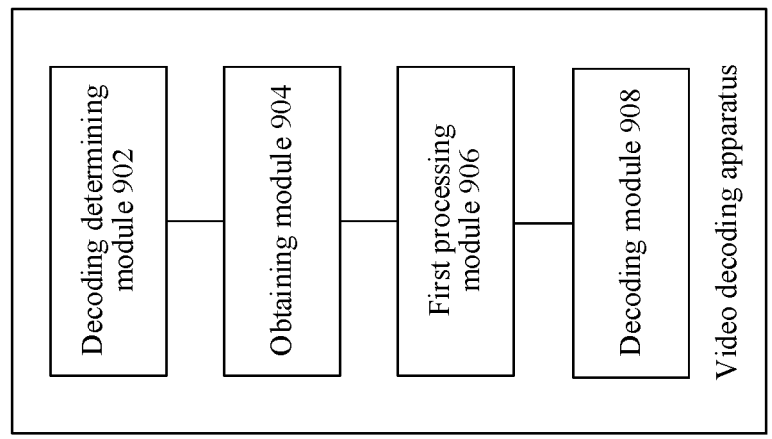
FIG. 9 is a schematic structural diagram of an exemplary video decoding apparatus according to an embodiment of this application.

According to another aspect of the embodiments of this application, a video decoding apparatus for implementing the video decoding method is further provided. As shown in FIG. 9, the apparatus includes:
(1) a decoding determining module 902, configured to determine a current video frame;
(2) an obtaining module 904, configured to obtain, from video frames that have been decoded, a first quantity of blocks of a first size and a second quantity of blocks of a second size in a reference frame associated with the current video frame, the first size being less than the second size;
(3) a first processing module 906, configured to determine, according to a relationship between the first quantity and the second quantity, a target resolution used for decoding the current video frame; and
(4) a decoding module 908, configured to decode the current video frame by using the target resolution.

As an exemplary solution, the first processing module 906 includes:
(1) a first processing submodule, configured to use a first resolution as the target resolution when a ratio of the first quantity to the second quantity is greater than a preset threshold; and further configured to use a second resolution as the target resolution when the ratio of the first quantity to the second quantity is less than the preset threshold, the second resolution being greater than the first resolution.

For the specific embodiments, reference may be made to the example shown in the foregoing video decoding method, and details are not described herein again in this example.

As an exemplary solution, the first processing module further includes:
(1) a first determining submodule, configured to determine a group of thresholds from a value interval greater than the preset threshold when the ratio of the first quantity to the second quantity is greater than the preset threshold;
(2) a comparison submodule, configured to compare the ratio of the first quantity to the second quantity with thresholds included in the group of thresholds;
(3) a second determining submodule, configured to determine a sampling ratio according to a result of the comparison; and
(4) a sampling submodule, configured to downsample the second resolution according to the sampling ratio, to determine the first resolution.

For the specific embodiments, reference may be made to the example shown in the foregoing video decoding method, and details are not described herein again in this example.

As an exemplary solution, the obtaining module 904 includes:
(1) a third determining submodule, configured to determine one reference frame from the video frames that have been decoded as a target reference frame; and
(2) a first obtaining submodule, configured to obtain the first quantity and the second quantity in the target reference frame.

For the specific embodiments, reference may be made to the example shown in the foregoing video decoding method, and details are not described herein again in this example.

As an exemplary solution,
(1) the third determining submodule includes: (1) a first determining unit, configured to determine a (t−k)th video frame as the target reference frame when the current video frame is a tth video frame; and
(2) the first obtaining submodule includes: (1) a first obtaining unit, configured to obtain the first quantity and the second quantity from the (t−k)th video frame, k being a predetermined positive integer, t being a positive integer, t being greater than k.

For the specific embodiments, reference may be made to the example shown in the foregoing video decoding method, and details are not described herein again in this example.

As an exemplary solution, the obtaining module 904 includes:
(1) a fourth determining submodule, configured to determine a plurality of reference frames from the video frames that have been decoded as target reference frames; and
(2) a second obtaining submodule, configured to obtain the first quantity and the second quantity in the target reference frames.

In some embodiments, the fourth determining submodule may determine the plurality of reference frames from the video frames that have been decoded as the target reference frames by using, but is not limited to, the following step: determining a plurality of consecutive video frames or a plurality of nonconsecutive video frames from the video frames that have been decoded as the target reference frames.

For the specific embodiments, reference may be made to the example shown in the foregoing video decoding method, and details are not described herein again in this example.

As an exemplary solution,
(1) the fourth determining submodule includes: (1) a second determining unit, configured to determine a (t–k1)th video frame to a (t–k2)th video frame as the target reference frames when the current video frame is a tth video frame; and
(2) the second obtaining submodule includes: (1) a second obtaining unit, configured to obtain the first quantity and the second quantity from the (t–k1)th video frame to the (t–k2)th video frame, k1 and k2 being predetermined positive integers, t being a positive integer, t being greater than k1, k1 being greater than k2.

For the specific embodiments, reference may be made to the example shown in the foregoing video decoding method, and details are not described herein again in this example.

Figure 10:
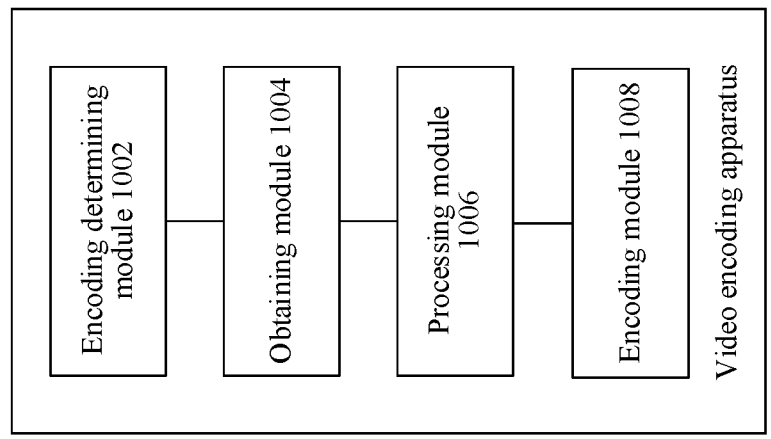
FIG. 10 is a schematic structural diagram of an exemplary video encoding apparatus according to an embodiment of this application.

According to another aspect of the embodiments of this application, a video encoding apparatus for implementing the video encoding method is further provided. As shown in FIG. 10, the apparatus includes:
(1) an encoding determining module 1002, configured to determine a current video frame;
(2) an obtaining module 1004, configured to obtain, from video frames that have been encoded, a first quantity of blocks of a first size and a second quantity of blocks of a second size in a reference frame associated with the current video frame, the first size being less than the second size;
(3) a processing module 1006, configured to determine, according to a relationship between the first quantity and the second quantity, a target resolution used for encoding the current video frame; and
(4) an encoding module 1008, configured to encode the current video frame by using the target resolution.

For the specific embodiments, reference may be made to the example shown in the foregoing video encoding method, and details are not described herein again in this example.

As an exemplary solution, the processing module 1006 includes:
(1) a first processing submodule, configured to use a first resolution as the target resolution when a ratio of the first quantity to the second quantity is greater than a preset threshold; and further configured to use a second resolution as the target resolution when the ratio of the first quantity to the second quantity is less than the preset threshold, the second resolution being greater than the first resolution.

For the specific embodiments, reference may be made to the example shown in the foregoing video encoding method, and details are not described herein again in this example.

As an exemplary solution, the processing module further includes:
(1) a first determining submodule, configured to determine a group of thresholds from a value interval greater than the preset threshold when the ratio of the first quantity to the second quantity is greater than the preset threshold;
(2) a comparison submodule, configured to compare the ratio of the first quantity to the second quantity with thresholds included in the group of thresholds;
(3) a second determining submodule, configured to determine a sampling ratio according to a result of the comparison; and (4) a sampling submodule, configured to downsample the second resolution according to the sampling ratio, to determine the first resolution.

For the specific embodiments, reference may be made to the example shown in the foregoing video encoding method, and details are not described herein again in this example.

Figure 11:
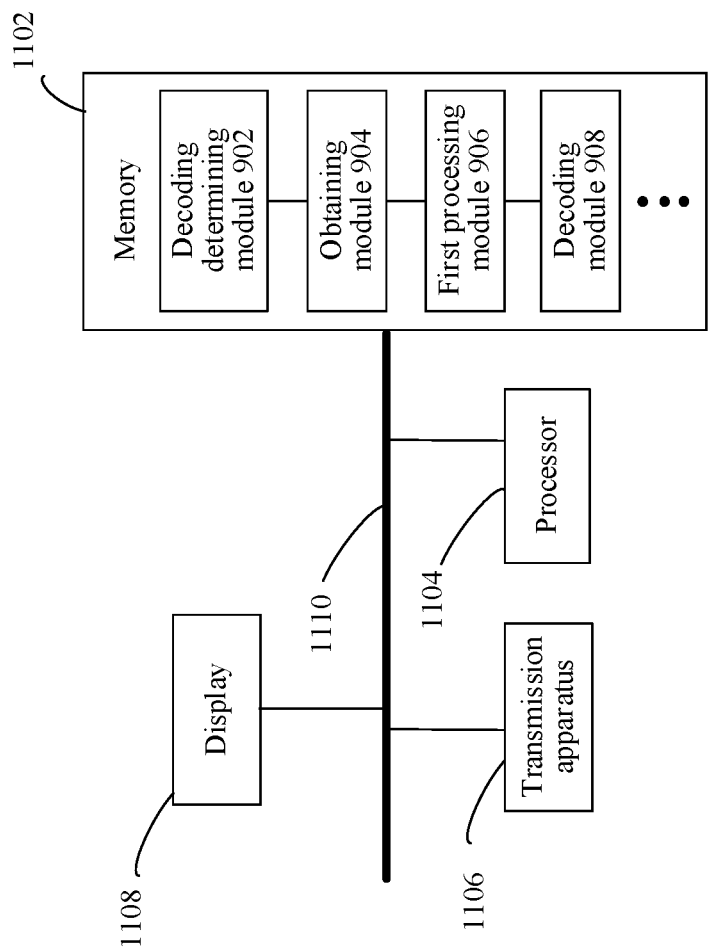
FIG. 11 is a schematic structural diagram of an exemplary electronic device according to an embodiment of this application.

According to still another aspect of the embodiments of this application, an electronic device for implementing the foregoing video decoding method is further provided in FIG. 11. The electronic device shown in FIG. 11 and FIG. 12 may be the foregoing electronic device. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The electronic device includes a memory 1102 and a processor 1104. The memory 1102 stores a computer program. The processor 1104 is configured to perform the steps in any one of the foregoing method embodiments by executing the computer program.

In some embodiments, the electronic device may be located in at least one of a plurality of network devices in a computer network.

In some embodiments, the processor may be configured to perform the following steps by executing the computer program.

S1: Determine a current video frame.

S2: Obtain, from video frames that have been decoded, a first quantity of blocks of a first size and a second quantity of blocks of a second size in a reference frame associated with the current video frame, the first size being less than the second size.

S3: Determine, according to a relationship between the first quantity and the second quantity, a target resolution used for decoding the current video frame.

S4: Decode the current video frame by using the target resolution.

In some embodiments, a person of ordinary skill in the art may understand that, the structure shown in FIG. 11 is only schematic. The electronic device may be a terminal device such as a smartphone (such as an Android mobile phone or an iOS mobile phone), a tablet computer, a palmtop computer, a Mobile Internet Device (MID), or a PAD. FIG. 11 does not limit the structure of the electronic device. For example, the electronic device may further include more or fewer components (such as a network interface) than those shown in FIG. 11, or have a configuration different from that shown in FIG. 11.

The memory 1102 may be configured to store a software program and a module, for example, a program instruction/module corresponding to the video decoding method and apparatus in the embodiments of this application, and the processor 1104 performs various functional applications and data processing by running a software program and a module stored in the memory 1102, that is, implementing the foregoing video decoding method. The memory 1102 may include a high-speed random access memory, and may also include a non-volatile memory, for example, one or more magnetic storage apparatuses, a flash memory, or another non-volatile solid-state memory. In some embodiments, the memory 1102 may further include memories remotely disposed relative to the processor 1104, and the remote memories may be connected to a terminal through a network. Examples of the network include, but are not limited to, the Internet, an intranet, a local area network, a mobile communication network, and a combination thereof. The memory 1102 may be specifically configured to, but is not limited to, store information such as a current video frame. As an example, as shown in FIG. 11, the memory 1102 may include, but is not limited to, the decoding determining module 902, the obtaining module 904, the first processing module 906, and the decoding module 908 in the video decoding apparatus. In addition, the memory may further include, but is not limited to, other modules and units in the foregoing video decoding apparatus. Details are not described in this example again.

In some embodiments, the foregoing transmission apparatus 1106 is configured to receive or transmit data through a network. Specific examples of the foregoing network may include a wired network and a wireless network. In an example, the transmission apparatus 1106 includes a network interface controller (NIC). The NIC may be connected to another network device and a router by using a network cable, so as to communicate with the Internet or a local area network. In an example, the transmission apparatus 1106 is a radio frequency (RF) module, which communicates with the Internet in a wireless manner.

In addition, the electronic device further includes: a display 1108, configured to display a decoded video; and a connection bus 1110, configured to connect various module components in the electronic device.

Figure 12:
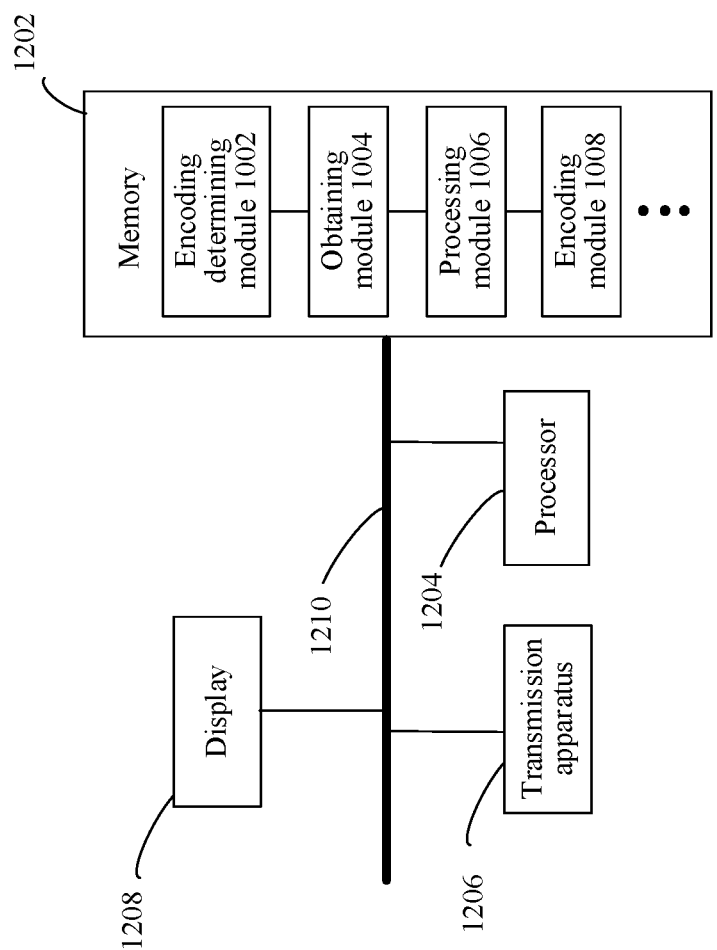
FIG. 12 is a schematic structural diagram of another exemplary electronic device according to an embodiment of this application.

According to yet another aspect of the embodiments of this application, an electronic device for implementing the foregoing video encoding method is further provided. As shown in FIG. 12, the electronic device includes a memory 1202 and a processor 1204. The memory 1202 stores a computer program, and the processor 1204 is configured to perform the steps in any one of the method embodiments by executing the computer program.

In some embodiments, the electronic device may be located in at least one of a plurality of network devices in a computer network.

In some embodiments, the processor may be configured to perform the following steps by executing the computer program.

S1: Determine a current video frame.

S2: Obtain, from video frames that have been encoded, a first quantity of blocks of a first size and a second quantity of blocks of a second size in a reference frame associated with the current video frame, the first size being less than the second size.

S3: Determine, according to a relationship between the first quantity and the second quantity, a target resolution used for encoding the current video frame.

S4: Encode the current video frame by using the target resolution.

In some embodiments, a person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, a MID, or a PAD. FIG. 12 does not limit the structure of the electronic device. For example, the electronic device may further include more or fewer components (such as a network interface) than those shown in FIG. 12, or have a configuration different from that shown in FIG. 12.

The memory 1202 may be configured to store a software program and a module, for example, a program instruction/module corresponding to the video encoding method and apparatus in the embodiments of this application, and the processor 1204 performs various functional applications and data processing by running a software program and a module stored in the memory 1202, that is, implementing the foregoing video encoding method. The memory 1202 may include a high-speed random access memory, and may also include a non-volatile memory, for example, one or more magnetic storage apparatuses, a flash memory, or another non-volatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically configured to, but is not limited to, information such as a current video frame. As an example, as shown in FIG. 12, the memory 1202 may include, but is not limited to, the encoding determining module 1002, the obtaining module 1004, the processing module 1006, and the encoding module 1008 in the video encoding apparatus. In addition, the memory may further include, but is not limited to, other modules and units in the foregoing video encoding apparatus. Details are not described in this example again.

In some embodiments, the foregoing transmission apparatus 1206 is configured to receive or transmit data through a network. Specific examples of the foregoing network may include a wired network and a wireless network. In an example, the transmission apparatus 1206 includes a NIC. The NIC may be connected to another network device and a router by using a network cable, so as to communicate with the Internet or a local area network. In an example, the transmission apparatus 1206 is an RF module, which communicates with the Internet in a wireless manner.

In addition, the electronic device further includes: a display 1208, configured to display a video before being encoded; and a connection bus 1210, configured to connect various module components in the electronic device.

According to still another aspect of the embodiments of this application, a computer-readable storage medium is further provided. The computer-readable storage medium stores a computer program, the computer program being configured to perform steps in any one of the foregoing method embodiments when being run.

In some embodiments, the computer-readable storage medium may be configured to store a computer program configured to perform the following steps:

S1: Determine a current video frame.

S2: Obtain, from video frames that have been decoded, a first quantity of blocks of a first size and a second quantity of blocks of a second size in a reference frame associated with the current video frame, the first size being less than the second size.

S3: Determine, according to a relationship between the first quantity and the second quantity, a target resolution used for decoding the current video frame.

S4: Decode the current video frame by using the target resolution.

In some embodiments, the computer-readable storage medium may be further configured to store a computer program configured to perform the following steps:

S1: Determine a current video frame.

S2: Obtain, from video frames that have been encoded, a first quantity of blocks of a first size and a second quantity of blocks of a second size in a reference frame associated with the current video frame, the first size being less than the second size.

S3: Determine, according to a relationship between the first quantity and the second quantity, a target resolution used for encoding the current video frame.

S4: Encode the current video frame by using the target resolution.

An embodiment of this application further provides a computer program product including instructions, the instructions, when run on a computer, causing the computer to perform the video decoding method or the video encoding method according to the foregoing embodiments.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video decoding method performed by an electronic device, the method comprising:
    determining a current video frame;
    obtaining, from video frames that have been decoded, a first quantity of blocks of a first size and a second quantity of blocks of a second size in a reference frame associated with the current video frame, the first size being less than the second size;
    determining, according to a relationship between the first quantity and the second quantity, a target resolution used for decoding the current video frame; and
    decoding the current video frame by using the target resolution.

2. The method according to claim 1, wherein the determining, according to a relationship between the first quantity and the second quantity, a target resolution used for decoding the current video frame comprises:
    using a first resolution as the target resolution when a ratio of the first quantity to the second quantity is greater than a preset threshold; and
    using a second resolution as the target resolution when the ratio of the first quantity to the second quantity is less than the preset threshold, the second resolution being greater than the first resolution.

3. The method according to claim 2, further comprising:
    determining a group of thresholds from a value interval greater than the preset threshold when the ratio of the first quantity to the second quantity is greater than the preset threshold;
    comparing the ratio of the first quantity to the second quantity with thresholds comprised in the group of thresholds;
    determining a sampling ratio according to a result of the comparison; and
    downsampling the second resolution according to the sampling ratio, to determine the first resolution.

4. The method according to claim 3, wherein the determining a sampling ratio according to a result of the comparison comprises:
    obtaining, when it is determined that the ratio of the first quantity to the second quantity falls within a target interval, a target sampling ratio configured for the target interval, the target interval comprising a value between a first threshold and a second threshold that are adjacent in the group of thresholds, the first threshold being less than the second threshold; and
    the downsampling the second resolution according to the sampling ratio comprises:
    downsampling a width and a height of the second resolution according to the target sampling ratio, to obtain the first resolution.

5. The method according to claim 1, wherein the obtaining, from video frames that have been decoded, a first quantity of blocks of a first size and a second quantity of blocks of a second size in a reference frame associated with the current video frame comprises:
- determining one reference frame from the video frames that have been decoded as a target reference frame; and
- obtaining the first quantity and the second quantity in the target reference frame.

6. The method according to claim 5, wherein the determining one reference frame from the video frames that have been decoded as a target reference frame comprises:
- determining a $(t-k)^{th}$ video frame as the target reference frame when the current video frame is a $t^{th}$ video frame; and
- the obtaining the first quantity and the second quantity in the target reference frame comprises:
- obtaining the first quantity and the second quantity from the $(t-k)^{th}$ video frame, k being a predetermined positive integer, t being a positive integer, t being greater than k.

7. The method according to claim 1, wherein the obtaining, from video frames that have been decoded, a first quantity of blocks of a first size and a second quantity of blocks of a second size in a reference frame associated with the current video frame comprises:
- determining a plurality of reference frames from the video frames that have been decoded as target reference frames; and
- obtaining the first quantity and the second quantity in the target reference frames.

8. The method according to claim 7, wherein the determining a plurality of reference frames from the video frames that have been decoded as target reference frames comprises:
- determining a plurality of consecutive video frames or a plurality of nonconsecutive video frames from the video frames that have been decoded as the target reference frames.

9. The method according to claim 7, wherein
the determining a plurality of reference frames from the video frames that have been decoded as target reference frames comprises:
- determining a $(t-k1)^{th}$ video frame to a $(t-k2)^{th}$ video frame as the target reference frames when the current video frame is a $t^{th}$ video frame; and
the obtaining the first quantity and the second quantity in the target reference frames comprises:
- obtaining the first quantity and the second quantity from the $(t-k1)^{th}$ video frame to the $(t-k2)^{th}$ video frame, k1 and k2 being predetermined positive integers, t being a positive integer, t being greater than k1, k1 being greater than k2.

10. The method according to claim 1, wherein the target resolution is further determined in the following manner:
- parsing a bitstream to obtain a decoding flag bit corresponding to the current video frame; and
- obtaining the target resolution indicated by the decoding flag bit.

11. A video encoding method performed by an electronic device, the method comprising:
- determining a current video frame;
- obtaining, from video frames that have been encoded, a first quantity of blocks of a first size and a second quantity of blocks of a second size in a reference frame associated with the current video frame, the first size being less than the second size;
- determining, according to a relationship between the first quantity and the second quantity, a target resolution used for encoding the current video frame; and
- encoding the current video frame by using the target resolution.

12. The method according to claim 11, wherein the determining, according to a relationship between the first quantity and the second quantity, a target resolution used for encoding the current video frame comprises:
- using a first resolution as the target resolution when a ratio of the first quantity to the second quantity is greater than a preset threshold; and
- using a second resolution as the target resolution when the ratio of the first quantity to the second quantity is less than the preset threshold, the second resolution being greater than the first resolution.

13. The method according to claim 12, further comprising:
- determining a group of thresholds from a value interval greater than the preset threshold when the ratio of the first quantity to the second quantity is greater than the preset threshold;
- comparing the ratio of the first quantity to the second quantity with thresholds comprised in the group of thresholds;
- determining a sampling ratio according to a result of the comparison; and
- downsampling the second resolution according to the sampling ratio, to determine the first resolution.

14. An electronic device, comprising:
- a processor, a communication interface, a memory, and a communication bus,
- the processor, the communication interface, and the memory communicating with each other by using the communication bus; the communication interface being an interface of a communication module;
- the memory storing computer-readable instructions, wherein the computer-readable instructions, when executed by the processor, cause the electronic device to perform a plurality of operations including:
- determining a current video frame;
- obtaining, from video frames that have been decoded, a first quantity of blocks of a first size and a second quantity of blocks of a second size in a reference frame associated with the current video frame, the first size being less than the second size;
- determining, according to a relationship between the first quantity and the second quantity, a target resolution used for decoding the current video frame; and
- decoding the current video frame by using the target resolution.

15. The electronic device according to claim 14, wherein the determining, according to a relationship between the first quantity and the second quantity, a target resolution used for decoding the current video frame comprises:
- using a first resolution as the target resolution when a ratio of the first quantity to the second quantity is greater than a preset threshold; and
- using a second resolution as the target resolution when the ratio of the first quantity to the second quantity is less than the preset threshold, the second resolution being greater than the first resolution.

16. The electronic device according to claim 15, wherein the plurality of operations further comprise:

determining a group of thresholds from a value interval greater than the preset threshold when the ratio of the first quantity to the second quantity is greater than the preset threshold;

comparing the ratio of the first quantity to the second quantity with thresholds comprised in the group of thresholds;

determining a sampling ratio according to a result of the comparison; and downsampling the second resolution according to the sampling ratio, to determine the first resolution.

17. The electronic device according to claim 14, wherein the obtaining, from video frames that have been decoded, a first quantity of blocks of a first size and a second quantity of blocks of a second size in a reference frame associated with the current video frame comprises:

determining one reference frame from the video frames that have been decoded as a target reference frame; and obtaining the first quantity and the second quantity in the target reference frame.

18. The electronic device according to claim 17, wherein the determining one reference frame from the video frames that have been decoded as a target reference frame comprises:

determining a $(t-k)^{th}$ video frame as the target reference frame when the current video frame is a $t^{th}$ video frame; and the obtaining the first quantity and the second quantity in the target reference frame comprises:

obtaining the first quantity and the second quantity from the $(t-k)^{th}$ video frame, k being a predetermined positive integer, t being a positive integer, t being greater than k.

19. The electronic device according to claim 14, wherein the obtaining, from video frames that have been decoded, a first quantity of blocks of a first size and a second quantity of blocks of a second size in a reference frame associated with the current video frame comprises:

determining a plurality of reference frames from the video frames that have been decoded as target reference frames; and obtaining the first quantity and the second quantity in the target reference frames.

20. The electronic device according to claim 14, wherein the target resolution is further determined in the following manner:

parsing a bitstream to obtain a decoding flag bit corresponding to the current video frame; and obtaining the target resolution indicated by the decoding flag bit.

* * * * *